United States Patent [19]
Starr

[11] Patent Number: 5,865,674
[45] Date of Patent: Feb. 2, 1999

[54] FLUSH LIGHTING SYSTEM FOR CLEANROOM

[75] Inventor: Jerry Starr, Albuquerque, N. Mex.

[73] Assignee: Envirco Corporation, Albuquerque, N. Mex.

[21] Appl. No.: 769,733

[22] Filed: Dec. 18, 1996

Related U.S. Application Data

[60] Provisional application No. 60/009,163 Dec. 22, 1995.
[51] Int. Cl.⁶ ........................................................ B01L 1/04
[52] U.S. Cl. ............................ 454/187; 454/294; 55/484; 55/385.2
[58] Field of Search ...................... 454/187, 293, 454/294; 55/484, 385.2

[56] References Cited

U.S. PATENT DOCUMENTS

| | | |
|---|---|---|
| 2,792,906 | 5/1957 | Evans . |
| 3,360,910 | 1/1968 | Soltis ........................................ 55/483 |
| 3,782,082 | 1/1974 | Smith et al. ............................... 55/494 |
| 3,986,850 | 10/1976 | Wilcox ...................................... 55/355 |
| 4,178,159 | 12/1979 | Fecteau ..................................... 55/385 |
| 4,233,044 | 11/1980 | Allan ......................................... 55/355 |
| 4,461,205 | 7/1984 | Shuler . |
| 4,511,380 | 4/1985 | Fetter ........................................ 55/355 |
| 4,518,405 | 5/1985 | Lough et al. .............................. 55/385 |
| 4,570,391 | 2/1986 | Quante et al. ............................. 52/39 |
| 4,608,066 | 8/1986 | Cadwell, Jr. .............................. 55/385 |
| 4,639,261 | 1/1987 | Pittman et al. ........................... 55/502 |
| 4,671,811 | 6/1987 | Cadwell, Jr. et al. .................... 55/355 |
| 4,678,487 | 7/1987 | Cadwell, Jr. et al. .................... 55/385 |
| 4,693,173 | 9/1987 | Saiki et al. . |
| 4,819,549 | 4/1989 | Gillingham et al. . |
| 4,883,513 | 11/1989 | Monson et al. ........................ 55/385.2 |
| 4,946,484 | 8/1990 | Monson et al. ........................ 55/385.2 |
| 5,192,348 | 3/1993 | Ludwig .................................. 55/385.2 |
| 5,279,632 | 1/1994 | Decker et al. ............................ 55/355 |
| 5,417,610 | 5/1995 | Spransy .................................. 454/187 |
| 5,454,756 | 10/1995 | Ludwig .................................. 454/293 |

FOREIGN PATENT DOCUMENTS

| | | |
|---|---|---|
| 0 044 283 | 1/1982 | European Pat. Off. . |
| 0 059 768 | 9/1982 | European Pat. Off. . |
| 1 658 781 | 8/1971 | Germany . |
| 1 709 367 | 2/1973 | Germany . |
| 59-29017 | 2/1984 | Japan . |
| 60-193515 | 10/1985 | Japan . |
| 60-193516 | 10/1985 | Japan . |

OTHER PUBLICATIONS

International Search Report, PCT/US96/20410, Apr. 2, 1997.

*Primary Examiner*—Harold Joyce
*Assistant Examiner*—Derek S. Boles
*Attorney, Agent, or Firm*—Arnold, White & Durkee

[57] ABSTRACT

A flush lighting system for cleanroom environments encompassing a modular ceiling design includes a light well housing, filter packs above and adjacent to the light well housing, and a locking apparatus to seal the various light well housings and filter packs. By utilizing such a design, filtered air flows uniformly downward across the entire area of the ceiling without creating dead air channels underneath the light wells.

25 Claims, 9 Drawing Sheets

FLUSH LIGHTING SYSTEM FOR CLEANROOM

This application claims the benefit of U.S. provisional patent application Ser. No. 60/009,163 by Jerry Starr, filed Dec. 22, 1995.

BACKGROUND OF THE INVENTION

The present invention relates to improving the airflow in a cleanroom by providing a constant downward airflow across the entire area of a cleanroom ceiling. More specifically, the present invention relates to a flush lighting system for a cleanroom, wherein filtered air is provided across the entire area of a cleanroom ceiling. Also, the present invention provides a unique method of installing and locking into place the filter banks within the ceiling system.

Recent designs of cleanroom environments have begun to incorporate flush lighting systems in the cleanroom ceilings. Traditionally, protruding lighting systems were utilized in cleanroom designs. However, these protruding lighting systems created several problems in cleanroom operation. First, protruding systems prevented easy reconfiguration of cleanroom equipment and layout, thereby inhibiting flexibility of cleanroom configuration. Second, the protruding systems interfered with the downward flow of filtered air over the entire area of the cleanroom ceiling. Therefore flush lighting systems were developed to aid in both flexibility of cleanroom design and minimization of air turbulence.

Generally, cleanrooms utilize many features to improve the air quality of its environment. Most applicable to the present invention is the constant downward flow of filtered air through the cleanroom into a raised floor assembly. Typically, air is drawn into a large chamber or plenums above groups of filters in modular fabricated assemblies in the ceiling of a cleanroom. The air is then pushed through filters which remove particulate matter from the air. The air then flows downwards through the cleanroom and into the grated raised floor assembly. The air in the cleanroom is thereby recirculated approximately every 5–10 seconds.

Cleanrooms are vital components of many manufacturing processes. For example, a cleanroom environment is necessary for semiconductor wafer processing techniques to minimize wafer contamination. As the size of critical dimensions of semiconductor circuits decreases, the air purity requirements in cleanroom environments will need to become even more stringent.

One source of impurities in present cleanroom environments is dead air channels which occur underneath lighting fixtures and ceiling grid supports. These areas do not move air downward through the cleanroom, but rather create turbulence which can cause impurities to travel to other areas within the cleanroom where they may impede optimal processing conditions. Most cleanroom ceiling systems do not include a manner to prevent these dead air channels.

Therefore, a system must be developed to reduce or eliminate dead air channels in cleanroom environments. One alternative currently utilized places a screen with beveled edges underneath the ceiling filters. The beveled edges of the screen aid in blowing filtered air across the space underneath light wells. Another alternative currently utilized incorporates holes in the sides of the walls which comprise the light well, thereby allowing some air to flow through the light well. Both of these current systems permit some airflow underneath light wells. However, these alternatives do not provide a dedicated source of filtered air to the light wells, thereby permitting continuous downward, lamar airflow across the entire area of a cleanroom ceiling. It would therefore be desirable to develop a system which enables filtered air to flow downward through the light well itself.

Another problem in the prior art relates to the methods utilized in adjoining modular members of a ceiling system. Most systems require that adjacent modular members first be placed within a sealing relation to each other, for example, by lifting an adjacent member to a position next to its complementary member. Then, most systems require the user to utilize some type of mechanical adapter, such as a clamp, to lock the modules into position. Alternately, some system adhesively attach filters within plenum assemblies. However, given the potential size of modular units, these methods are cumbersome. It would therefore be desirable to develop a system which, upon lifting an adjacent member into position, it becomes automatically locked into place without the need for a second step.

SUMMARY OF THE INVENTION

The objectives of the present invention are directed to the above described problems. More particularly, the apparatus and methods of the present invention present a flush lighting system which permits filtered downward airflow across the entire area of a cleanroom ceiling. Filtered air will therefore pass through the light wells themselves in a continuous downward flow. Continuous downward airflow will also be maintained in between light wells, thereby creating filtered airflow across the entire area of a cleanroom ceiling. Also, the present invention provides a unique method of joining modular units of a ceiling system by utilizing a support structure to lock the units together.

The present invention includes a lighting fixture comprising a housing having a lower and an upper opening and comprising a plurality of walls. The lower opening may be configured to receive a plate-like member positioned in the lower opening, and the upper opening may be configured to receive an air filter. A first primary sealing member may be positioned along at least one of the plurality of walls adapted to interengage a first complementary sealing member of a proximate wall to effect a seal therebetween; and a second primary sealing member may be positioned along at least one of the plurality of walls and above the first sealing member adapted to interengage a second complementary sealing member associated with the air filter to effect a seal therebetween.

The present invention also includes a modular lighting fixture for cleanrooms comprising a housing having first and second openings and comprising a plurality of walls having a first and second portion. The first opening may be configured to receive a plate-like member positioned in the first opening, and the second opening may be configured to receive an air filter. A first primary sealing member may be positioned along the first portion of at least one of the plurality of walls adapted to interengage a first modular member adjacent at least one of the plurality of walls to effect a seal therebetween, and a second primary sealing member may be positioned along the second portion of at least one of the plurality of walls adapted to interengage a second modular member adjacent at least one of the plurality of walls to effect a seal therebetween.

The present invention also includes a modular ceiling system comprising a walled housing having a lower and an upper opening, the lower opening configured to support an air-permeable membrane, the upper opening configured to receive a first air filter, a first sealing member positioned along each wall of the housing adapted to interengage a proximate wall to effect a seal therebetween, and a second sealing member positioned along each wall and above the first sealing member adapted to interengage the first air filter to effect a seal therebetween; a proximate walled housing enclosing a second air filter and adapted to be sealed to the walled housing so that the housings are substantially vertically flush; and a frame adapted to surround the walled housing and the proximate walled housing and sealably engage the housings, thereby creating a modular unit.

Accordingly, one object of the present invention is to provide filtered airflow downwardly over a lightwell structure. It is another object of the present invention to provide modular components to a flush lighting system which are readily installed and removed by means of a locking assembly. It is a further object of the present invention to provide a method of installation and removal of modular components of a flush lighting system utilizing a locking assembly.

DETAILED DESCRIPTION

Figure 1:
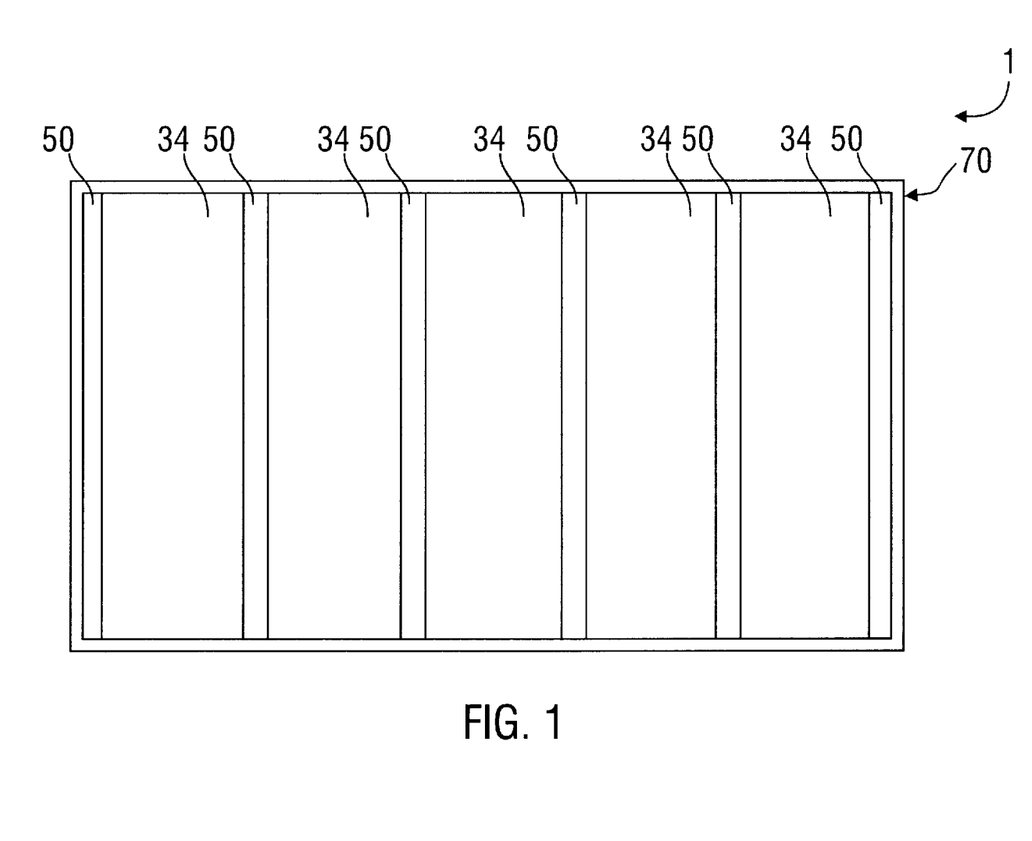
FIG. 1 is a bottom view of a modular flush lighting system according to the present invention.

FIG. 1 is a bottom view of a modular flush lighting ceiling system according to the present invention. As shown in FIG. 1, the ceiling module 1 includes a plurality of filter units 34 and light well covers 50, through which filtered air flows uniformly down towards the floor of the cleanroom. Interspersed between the filter units 34 are a plurality of flush light wells which are covered by the light well covers 50. The light well covers 50 may be, for example, of perforated polycarbonate material, such as perforated lexan, which permits filtered air to pass through. However, any known substantially transparent perforated material may be used. Above the covers 50 are the light sources 15 which are not shown in FIG. 1. Above the light sources 15 are the filter units 22, not shown in FIG. 1, through which filtered air flows uniformly down towards the floor of the cleanroom. The system is supported by perimeter frame structure 70, which is located around the perimeter of the filter and lighting units.

It will be noted by those skilled in the art that different combinations of filters and light wells may be contemplated. For example, a module system according to the present invention may include light wells at both ends of the module, as shown in FIG. 1. Alternately, one end or neither end of the module may include a light well. Additionally, light wells may be placed adjacent to each other, without an intervening filter unit. Further, several filter units may be placed adjacent to each other, without an intervening light unit. Also, penetrations for sprinkler systems may be provided by furnishing special sized filters and blank panels. These and additional combinations are contemplated by the present invention.

Figure 2:
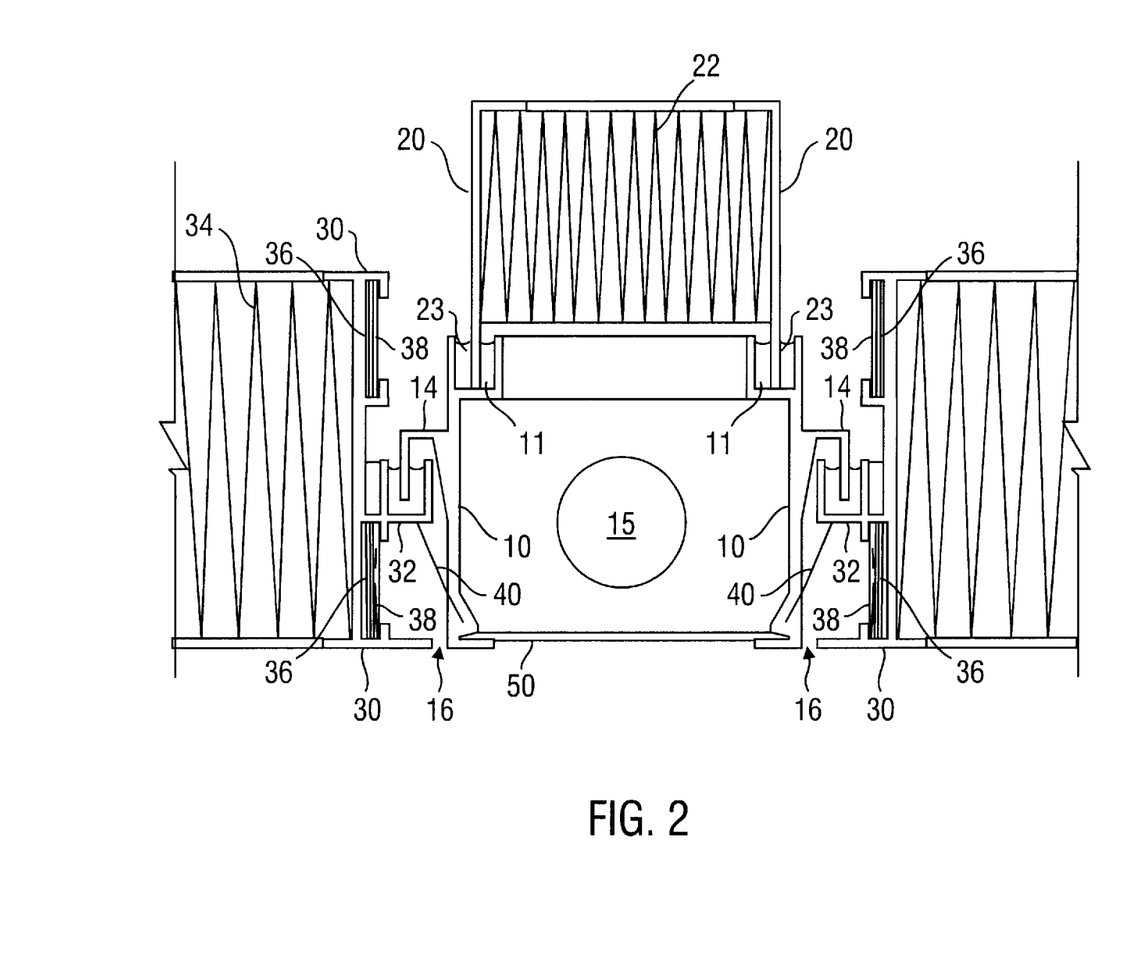
FIG. 2 is a side cross-sectional view of a light well and adjoining filters according to the present invention.

A preferred embodiment of the flush light system according to the present invention is shown cross-sectionally in FIG. 2. The flush light system includes a light well extrusion 10, upper filter frame 20, lower filter extrusion 30, supporting members 40, and a light well cover 50. All of the extrusions and the filter frame may be, for example, fabricated from aluminum. The light well extrusion 10 encloses the light source 15. The light source 15 may be, for example, a T8 fluorescent lamp. The lower filter extrusion 30 mates to the light well extrusion 10 by means of the sealing members 14 on either side of the light well extrusion 10. The upper filter frame 20 mates with and seals at the light well extrusion 10 by means of the sealing members 23 on either side of the filter frame 20. Both sealing members 14 and sealing members 23 may be, for example, knife-edge flanges. However, any known sealing mechanism, such as a clamp, may be used.

In an exemplary embodiment, the sides of light well extrusion 10 may be slotted with openings. These openings allow filtered air from upper filter frame 20 to pass through the gap 16 which is present between light well extrusion 10 and the adjoining extrusions. This filtered air passes through the gap 16 and flows in a downward direction through the cleanroom.

Upper filter frame 20 encloses a filter 22. In a preferred embodiment, the filter 22 may be, for example, a HEPA filter or an ULPA filter. Specifically, the filter may range in size from approximately 40 to 100 mm, for example, and may preferably be a 70 mm separatorless (string separator) filter pack. However, the filter frame 20 may include another method for cleaning air, such as advanced filtering media, for example, a filter constructed from Gore-Tex material. Also, upper filter frame 20 is rigid and sealed upon encapsulation of the filter pack 22 within the filter frame 20. Upper filter frame 20 may be constructed from, for example, press form aluminum. The filter pack 22 may be encapsulated within the perimeter of filter frame 20 using a polyurethane material, and preferably a catalyzed polyurethane.

Further, light well extrusion 10 includes a sealing member 11 which may be filled with a sealing compound. The sealing compound may be, for example, a gel sealing compound, such as a silicon gel. The sealing member 11 may be, for example, a trough, although any known sealing mechanism, such as a clamp may be used. This trough 11 permits the upper filter frame 20 to mate with the light well extrusion 10 at the knife-edge flange 23. The mating of the knife-edge flange 23 and the trough 11 automatically positions the filter frame 20 so that it remains sealed in place above the light well extrusion 10. In a preferred embodiment, the knife-edge flange 23 may be aligned vertically to the base of trough 11. A sealing compound is not necessary to seal the light well extrusion 10 to filter frame 20, and the present invention may utilize any known sealing mechanism, such as a gasket sealing system, to adequately perform the sealing function.

To install the filter frame 20 into position above light well extrusion 10, it is lifted above the opening over light well extrusion 10. The filter frame 20 is then lowered until the knife-edge is flanges 23 are mated within the troughs 11, thereby locking the upper filter frame 20 into proper position.

In an alternate embodiment which is not shown, the top of filter frame 20 may also include an adapter. This adapter would be utilized to insert a plenum above the filter 22, in the event that a motorized filter module or terminal filter is desired.

FIG. 2 also shows the adjoining of lower filter extrusion 30 to light well extrusion 10. Lower filter extrusion 30 encloses a filter 34. In a preferred embodiment, the filter 34 may be, for example, a HEPA filter or an ULPA filter. Specifically, the filter may range in size from approximately 40 to 100 mm, for example, and may preferably be a 70 mm separatorless (string separator) filter pack. However, the filter extrusion 30 may include another method for cleaning air, such as advanced filtering media, for example, a filter constructed from Gore-Tex material. The filter extrusion 30 may include, preferably along the upper and lower portion, a race 36 for a corner reinforcement angle. Comer reinforcement angles 38 are utilized to form a filter extrusion which is rigid and sealed upon encapsulation of the filter pack 34 within the filter extrusion 30. The filter 34 may be encapsulated within the perimeter of filter extrusion 30 using a polyurethane material, preferably a catalyzed polyurethane. The comer reinforcement angles 38 are serrated, interference-fit comer angles. The comers of the filter extrusion 30 are mitered and are driven together at the point of their respective races with the comer reinforcement angles 38.

The bottom of the filter pack 34 encapsulated within lower filter extrusion 30 may be covered by a filter protector and diffuser. For example, the bottom of the filter pack 34 may be a screen which is placed across the entire area of the filter pack. Alternately, a screen may be integrally connected to the bottom of the filter pack 34.

In an alternate embodiment, the top of filter extrusion 30 may also include an adapter. This adapter would be utilized to insert a plenum above the flush lighting system of the present invention, in the event that a motorized filter module or terminal filter is desired.

Further, lower filter extrusion 30 includes a sealing member 32 which may be filled with a sealing compound, for example, gel sealing compound, such as silicon gel. The sealing member 32 may be, for example, a trough. It is noted by those skilled in the art that this is transposed from the typical system, wherein the light well extrusion supports a trough. This trough 32 permits the lower filter extrusion 30 to mate with the light well extrusion 10 at the knife-edge flange 14. The mating of the knife-edge flange 14 and the trough 32 automatically positions the filter extrusion 30 so that it remains sealed in place adjacent to the light well extrusion 10. In a preferred embodiment, the knife-edge flange 14 may be aligned vertically to the base of trough 32. However, a sealing compound is not necessary to seal the light well extrusion 10 to filter extrusion 30, and the present invention may utilize a gasket sealing system to adequately perform the sealing function.

The lower filter extrusion 30 is supported by support members 40. These support members 40 may be, for example, clips, however any known support mechanism, such as a pin, may be used. The clips 40 may be constructed of, for example, spring steel, tempered stainless steel, or beryllium. The clips 40 are inserted into a slit extruded into the exterior portion of the light well extrusion 10, below the trough 32 of the filter extrusion 30. The clips are peened into place in the slits of light well extrusion 10. In a preferred embodiment, four clips will be used to support a filter extrusion 30. The clips may vary in length taking into consideration varied filter sizes and their respective weights.

To install the lower filter extrusion 30 into position adjacent to light well extrusion 10, it is lifted into the opening adjacent to light well extrusion 10. The filter extrusion 30 is then raised until the clips 40 lock into place under troughs 32. At this point, the knife-edge flanges 14 will be mated with the troughs 32 and the lower filter extrusion 30 will be locked into proper position.

To remove the lower filter extrusion 30 from its position adjacent to the light well extrusion 10, a small tool may be utilized. First, one side of the filter extrusion 30 must be raised slightly. Then the tool, which may be thin and fork-shaped, is pushed upward on each clip 40 in turn until it disengages from under the trough 32. When all of the clips are thereby disengaged, the filter extrusion 30 may be easily removed from the light well extrusion 10. These same steps apply when seeking to remove or install a lower filter extrusion 30 adjacent to the perimeter frame extrusion 70.

After the subunits of module system 1 have been connected, the light sources 15 may be installed into the light well extrusions 10, as is known to those skilled in the art. After the light sources 15 have been installed, the light well covers 50 may be snapped into position underneath the light sources. The light well covers 50 may be made of, as discussed above, perforated lexan. The covers 50 form a slight amount of pressurization which helps even out the airflow below the light tube 15 and impart a directional downward flow to it.

Figure 3:
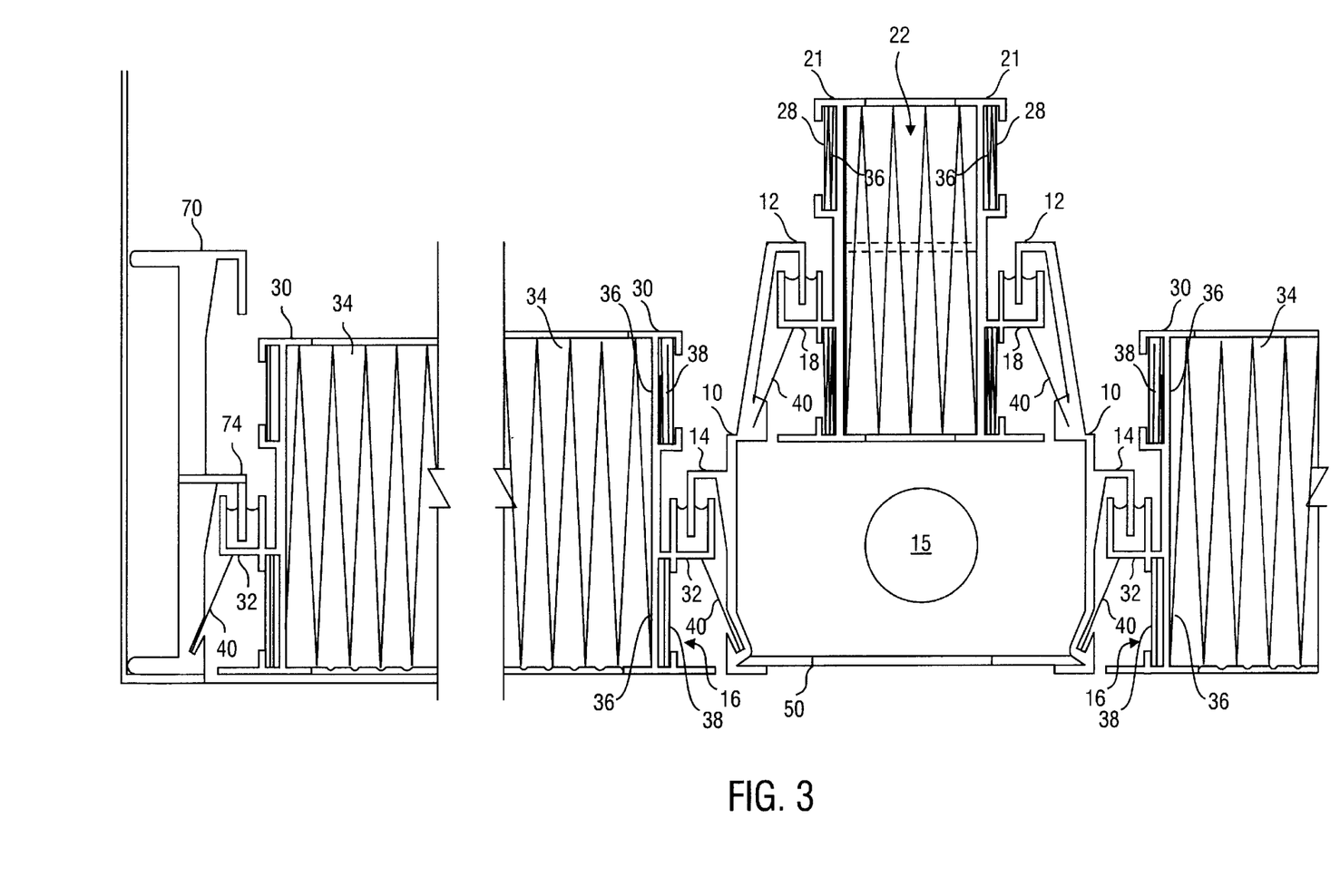
FIG. 3 is a side cross-sectional view of an alternate embodiment of a light well and adjoining filters.

An alternate embodiment of a flush light system according to the present invention is shown cross-sectionally in FIG. 3. The lower filter extrusion 30 may be joined to the light well extrusion module 10 by means of the knife-edge flanges 14 on either side of the light well extrusion 10. The upper filter extrusion 21 may be joined to the light well extrusion module 10 by means of the knife-edge flanges 12 on either side of the light well extrusion 10.

As discussed above, in an exemplary embodiment, the sides of light well extrusion 10 may be slotted with openings. These openings allow filtered air from upper filter extrusion 21 to pass through the gap 16 which is present between light well extrusion 10 and the adjoining extrusions. This filtered air passes through the gap 16 and flows in a downward direction through the cleanroom.

Upper filter extrusion 21 encloses a filter 22. As discussed above, the filter 22 may be, for example, a HEPA or ULPA filter. The filter extrusion 21 may include, preferably along the upper and lower portion, a race 36 for a corner reinforcement angle. Corner reinforcement angles 28, are utilized to form a filter extrusion which is rigid and sealed upon encapsulation of the filter pack 22 within the filter extrusion 21. The corner reinforcement angles 28 are serrated, interference-fit corner angles. The corners of the filter extrusion 21 are mitered and are driven together with the corner reinforcement angles 28. Also, upper filter extrusion 21 is rigid and sealed upon encapsulation of the filter pack 22 within the filter extrusion 21. The filter 22 may be encapsulated within the perimeter of filter extrusion 21 using a polyurethane material, and preferably a catalyzed polyurethane.

Further, upper filter extrusion 21 includes a trough 18 which may be filled with a sealing compound. The sealing compound may be, for example, a gel sealing compound, such as silicon gel. It is noted by those skilled in the art that this configuration is transposed from the typical system, wherein the light well extrusion contains the trough. This trough 18 permits the upper filter extrusion 21 to mate with the light well extrusion 10 at the knife-edge flange 12. The mating of the knife-edge flange 12 and the trough 18 automatically positions the filter extrusion 21 so that it remains sealed in place above the light well extrusion 10. It is preferred that the knife-edge flange 12 be aligned vertically to the base of trough 18. However, a sealing compound is not necessary to seal the light well extrusion 10 to filter extrusion 21, and the present invention may utilize any known sealing mechanism, such as a gasket sealing system, to adequately perform the sealing function.

The filter extrusion 21 is supported by supporting members 40. As discussed above, these supporting members may be, for example, clips made of spring steel, stainless steel, beryllium, or the like. The clips 40 are inserted into a slit extruded into the interior portion of the light well extrusion 10, below the trough 18 of the filter extrusion 21. It is preferred that four clips be used to support the filter extrusion 21. The clips may vary in length taking into consideration varied filter sizes and their respective weights. The clips are peened into place in the slits of light well extrusion 10.

To install the filter extrusion 21 into position above light well extrusion 10, it is lifted into the opening within light well extrusion 10. The filter extrusion 21 is then raised until the clips 40 lock into place under troughs 18. At this point, the knife-edge flanges 12 will be mated with the troughs 18 and the upper filter extrusion 21 will be locked into proper position.

After the subunits of module system 1 have been connected, the light sources 15 may be installed into the light well extrusions 10, as is known to those skilled in the art. After the light sources 15 have been installed, the light well covers 50 may be snapped into position underneath the light sources.

As discussed above, a small tool may be utilized to remove the filter extrusion 21 from its position above the light well extrusion 10. First, one side of the filter extrusion 21 must be raised slightly. Then the tool is in turn pushed upward on each clip 40 until it disengages from under the trough 18. When all of the clips are thereby disengaged, the filter extrusion 21 may be removed from the light well extrusion 10.

Figure 4:
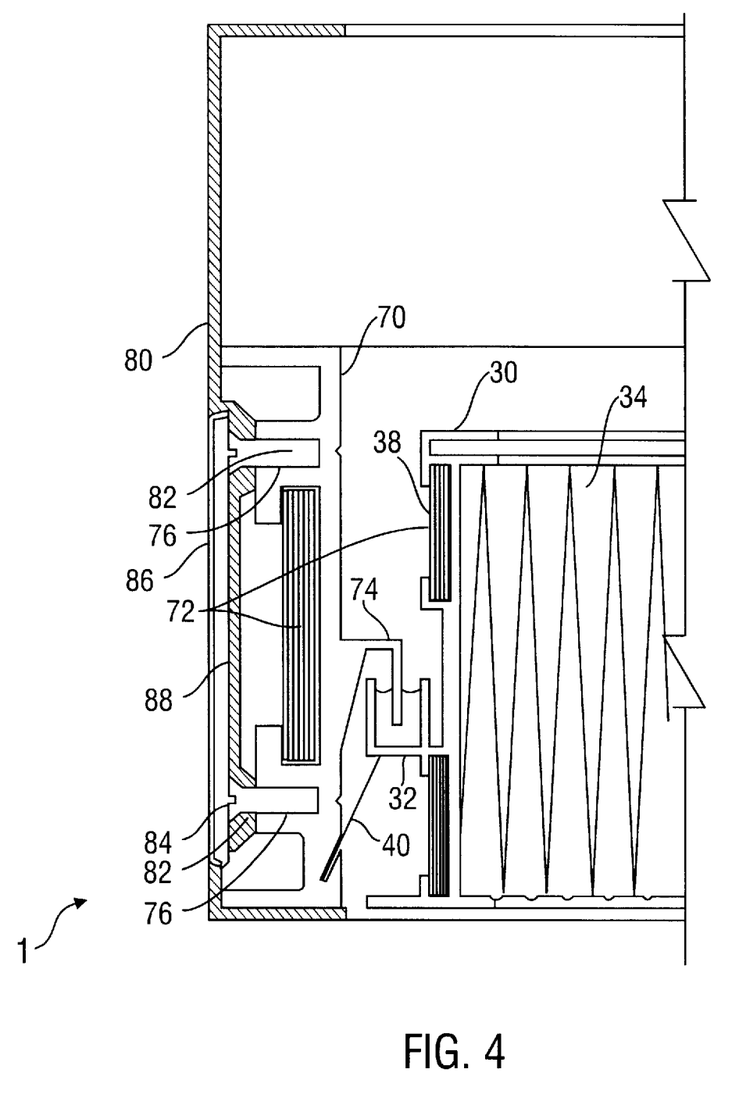
FIG. 4 is a side cross-sectional view of the perimeter of a modular flush lighting system adjoined to a filter.

FIG. 4 shows the perimeter frame extrusion 70, which forms the support for the entire perimeter of the module system of the present invention. Perimeter frame extrusion 70 includes a corner reinforcement angle 72, a knife-edge flange 74, and two screw thread bosses 76, which are used for module joining. The corner reinforcement angle 72 is assembled in the same fashion as corner reinforcement angle 38 of lower filter extrusion 30, as discussed above. However, to further strengthen the perimeter of the module unit 1, the corner joints of frame 70 are welded after being driven together. The perimeter frame extrusion may be adjacent to a filter extrusion 30, as shown in FIG. 4. As discussed above, this filter extrusion 30 is sealed in position by placing knife-edge flange 74 of the perimeter frame extrusion in trough 32 and locking the trough 32 in place with clips 40.

As shown in FIG. 4, a skirt extrusion 80 may be joined to the exterior side of the perimeter frame extrusion 70. This skirt extrusion 80 forms a cover for the perimeter frame 70. Further, the top portion of the skirt extrusion 80 provides a flange for fastening a plenum to the top of the module. The skirt extrusion 80 includes two countersink races 82, which are the proper size to receive the screws 84 which are used to join the skirt extrusion 80 to the perimeter frame extrusion 70. Further, the surface 88 of the skirt extrusion 80 which is in between countersink races 82 may be countersunk to permit a snap-in cover 86 to be inserted to hide the screws 84. This snap-in cover 86 therefore forms a continuous finished appearance around the perimeter of the module unit 1.

Figure 5:
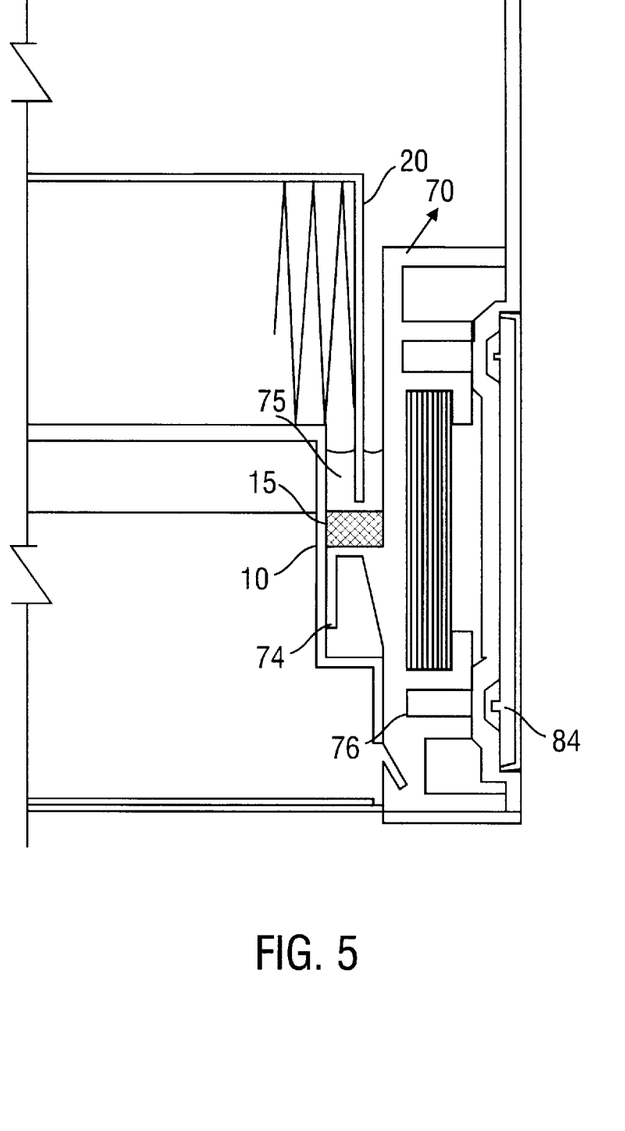
FIG. 5 is a side cross-sectional view of the perimeter of a modular flush lighting system depicting the light well end detail.

FIG. 5 shows an alternative embodiment, wherein the perimeter frame extrusion 70 may be adjacent to a light well extrusion 10. In this embodiment, a channel 15 is fabricated at the ends of light well extrusion 10. The channel 15 may be made of, for example, aluminum. This channel 15 is fabricated above the point at which knife-edge flange 74 of the perimeter frame extrusion 70 and light well extrusion 10 meet at the end of light well extrusion 10. The combination of channel 15, lightwell extrusion 10, and knife-edge flange 74 therefore forms a closed raceway which comprises the trough 75. The trough 75 may be filled with sealing compound, for example, a gel sealing compound, such as silicon gel. The lower portion of upper filter frame 20 mates with this trough to form a seal between the light well extrusion 10 and the perimeter frame extrusion 70. Also as shown in FIG. 5, the connection of light well extrusion 10 and perimeter frame extrusion 70 is further strengthened by fastening a screw 84 to light well extrusion 10 through screw thread boss 76.

Figure 6:
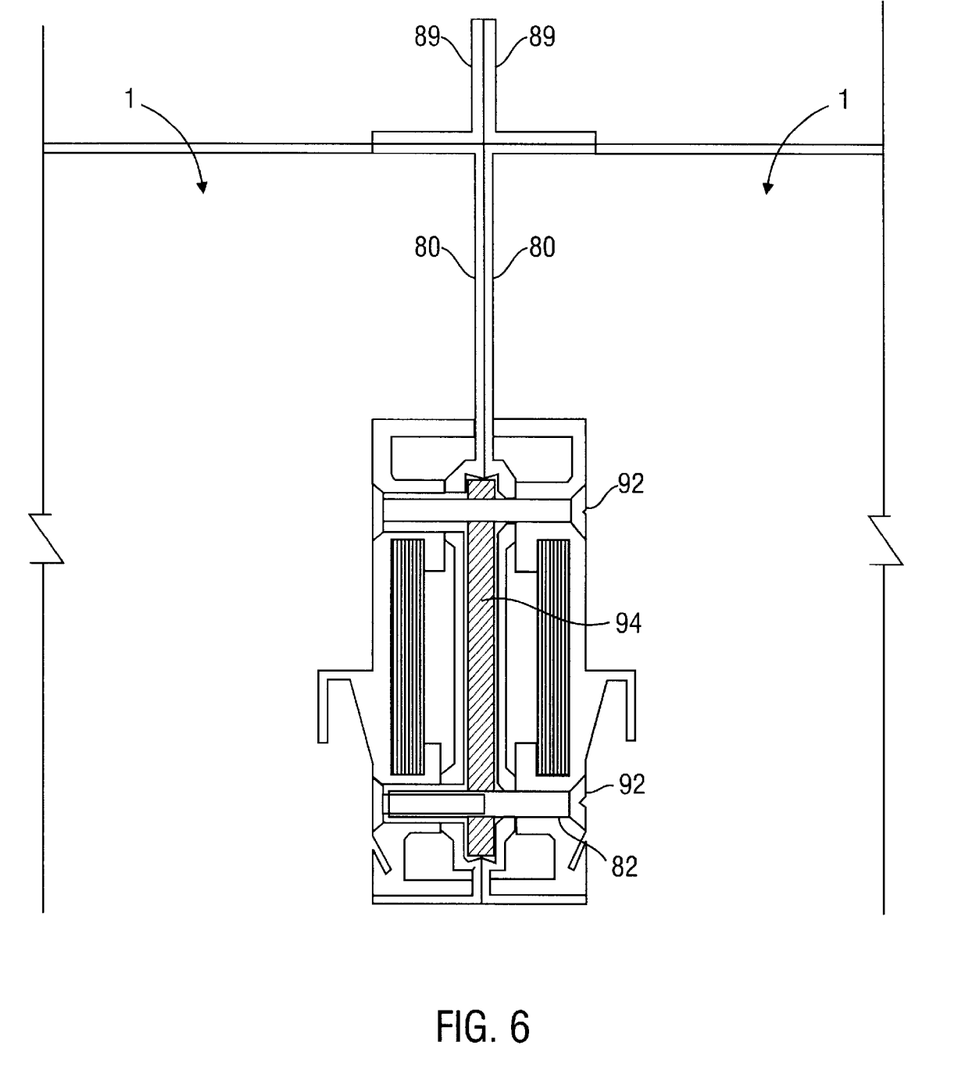
FIG. 6 is a side cross-sectional view of the joining of two modular flush lighting assemblies according to the present invention.

An alternative embodiment is shown in FIG. 6. FIG. 6 shows a module system, wherein two module units 1 are joined together at their respective skirt extrusions 80. The two modules are joined by means of binding post bolts 92, which are mated through countersink races 82. To strengthen the joining of the modules, a reinforcing bar 94 may be placed in between the skirt extrusions 80 which are to be joined. This reinforcing bar 94 may be, for example, of steel material. The bar 94 may extend along the entire length of the module. Further, FIG. 6 shows a bottom perimeter flange 89 of a plenum which is attached to the flange at the top of skirt extrusion 80. Bottom perimeter flange 89 may be made of a suitable material, for example, aluminum. The bottom perimeter flange 89 may be attached by fastening several screws through the bottom perimeter flanges 89 and skirt extrusion 80.

Figure 7:
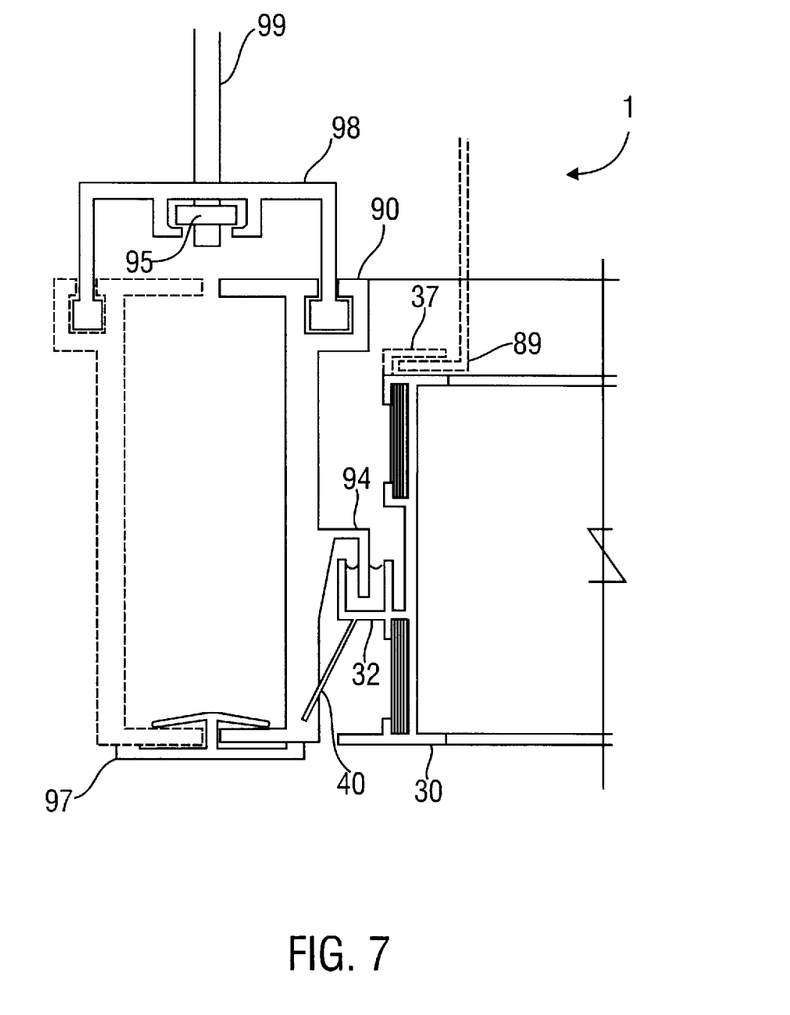
FIG. 7 is a side cross-sectional view of a modular flush lighting system utilized in conjunction with a ceiling grid frame system.

FIG. 7 shows the connection of the modular system 1 of the present invention to a ceiling grid frame 90. The ceiling grid frame 90 performs the same function as the perimeter frame extrusion 70. The ceiling grid frame 90 is used in installations that require full ceiling areas with various filter configurations. At the present time, most of these systems are built using a tee-bar grid ceiling system. Several ceiling grid frames 90 may be joined together using both a hanger bracket 98 and a locking key extrusion 97. The hanger bracket 98 is supported by a rod 99 extending from the ceiling. A captive nut 95 is used to secure the rod 99 to the hanger bracket 98. The ceiling grid frame 90 connects to filter extrusion 30 by means of knife-edge flange 94. Knife-edge flange 94 of the ceiling grid frame 90 is placed into the trough 32 of the filter extrusion 30, as discussed above in greater detail in connection with FIG. 2. Clips 40 are used to lock the trough 32 into place, thereby sealing the module to ceiling grid frame 90. As indicated by the dashed lines, filter extrusion 30 may also include an adapter 37 which is used to engage a bottom perimeter flange 89 of a plenum 89. Adapter 37 may be fastened to filter extrusion 30 by means of, for example, several screws or may be an extruded part of filter extrusion 30. After the filter extrusion 30 and adjoined adapter 37 are located around the bottom perimeter flange 89 of the plenum, the unit is affixed into place by means of crimping top flange 37.

Figure 8:
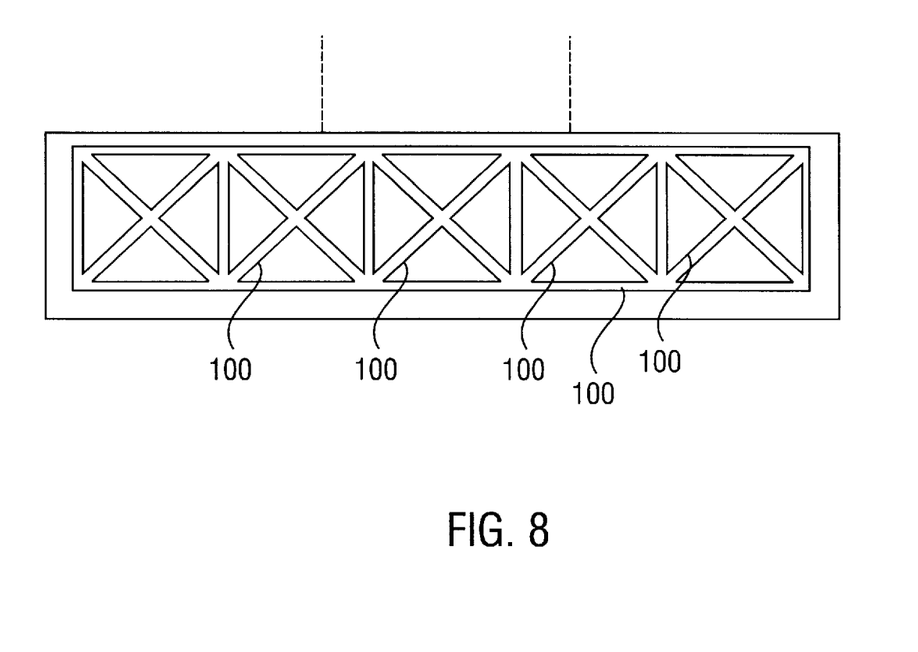
FIG. 8 is a side cross-sectional view of a deformed structural panel configuration utilized in conjunction with a plenum construction including a modular flush lighting system.

FIG. 8 shows a side cross-sectional view along the width or length of the ceiling module 1 according to the present invention. Deformed panels 100 form the perimeters of the various ceiling modules by adding strength by the deformation. The purpose of the deformed panels 100 is to ensure structural integrity of the ceiling modules 1. These panels 100 uniformly distribute the weight of the various extrusions, thereby increasing the structural integrity of the modular system. The deformation pattern of the panels 100 is designed to stiffen the sidewalls and the top panels of any attached plenums so that subframes are not required. The plenums are an enclosure within the deformed panels 100 and form an integral truss effect within the panels 100. These panels provide strength to the sides and the top panels which are required to support the weight of service personnel.

Figure 9:
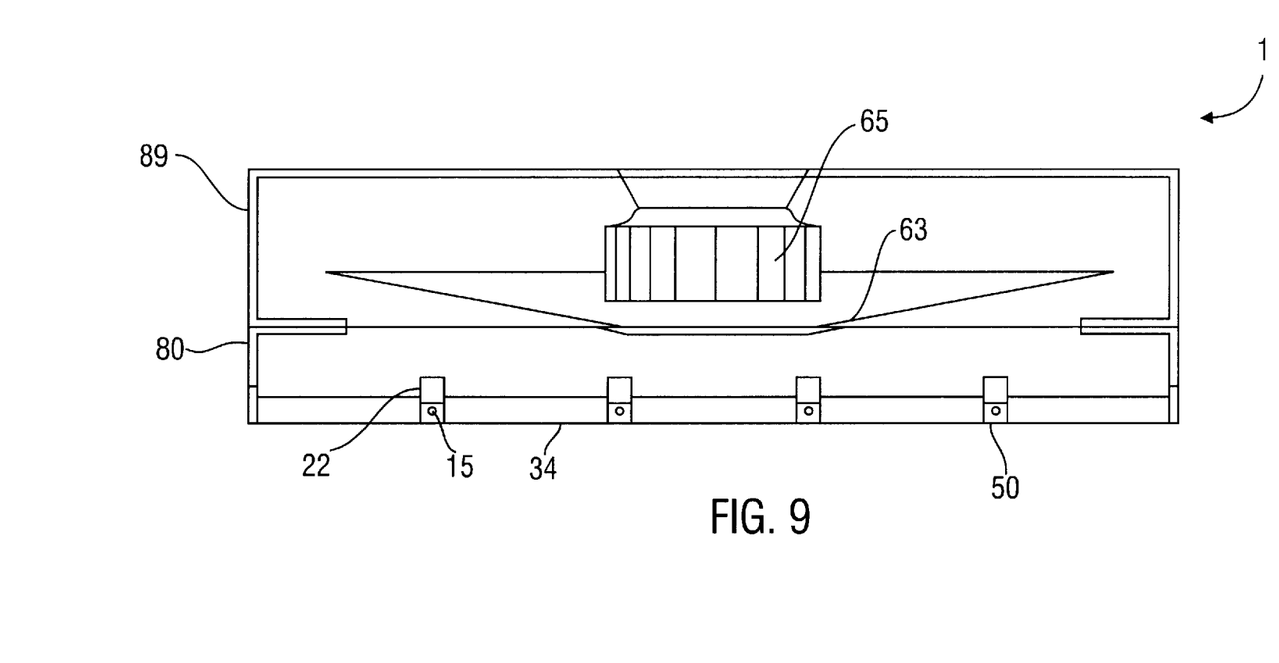
FIG. 9 is a side cross-sectional view of a modular flush lighting system of the present invention in conjunction with an entire air supply module.

FIG. 9 shows a side cross-sectional view along the width of the ceiling module 1 according to the present invention as used in conjunction with an integrated air supply system. Alternately, the present invention need not combine with an integrated system, and may connect to a ceiling grid-frame, as shown in FIG. 7. With reference again to FIG. 9, above the ceiling module 1 is a baffle 63 and plug fan 65 included in plenum module. The ceiling module 1 is attached at skirt extrusion 80 to plenum support 89 of the plenum module. The baffle 63 and plug fan 65 deliver the proper volume of air to the filters of the present invention. The velocity of air may be selected to obtain the desired airflow, such as may be required to meet federal standards. The plug fan 65 creates a flow of air in a generally horizontal direction which the baffle 63 distributes uniformly in a downward manner to the filters of the present invention. More specific information regarding operation and construction of a ceiling module including a baffle and plug fan can be found in U.S. Pat. No. 4,560,395, which is hereby incorporated by reference.

Further modification and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A lighting fixture, comprising:
    a housing having a lower and an upper opening, said housing comprising a plurality of walls;
    the lower opening configured to receive a plate-like member positioned in said lower opening;
    the upper opening configured to receive an air filter to permit airflow exiting said air filter to flow through said upper opening;
    a first primary sealing member positioned along at least one of said plurality of walls and above said lower opening to interengage a first complementary sealing member of a proximate wall to effect a seal therebetween such that said lower opening and said proximate wall are substantially flush at a lowest point of said housing and said proximate wall; and
    a second primary sealing member positioned along at least one of said plurality of walls and above said first sealing member adapted to interengage a second complementary sealing member associated with said air filter to effect a seal therebetween.

2. A lighting fixture according to claim 1, wherein the housing comprises extruded aluminum.

3. A lighting fixture according to claim 1, wherein the plate-like member comprises air permeable polycarbonate.

4. A lighting fixture according to claim 1, wherein the plate-like member comprises perforated lexan.

5. A lighting fixture according to claim 1, wherein said first primary sealing member comprises a knife-edge flange.

6. A lighting fixture according to claim 1, wherein said first complementary sealing member comprises a trough.

7. A lighting fixture according to claim 6, wherein said trough contains a sealing compound.

8. A lighting fixture according to claim 7, wherein said sealing compound comprises a gel.

9. A lighting fixture according to claim 1, wherein said second primary sealing member comprises a knife-edge flange.

10. A lighting fixture according to claim 1, wherein said second complementary sealing member comprises a trough.

11. A lighting fixture according to claim 1, wherein said air filter comprises a filter pack.

12. A lighting fixture according to claim 1, wherein said air filter comprises a HEPA filter.

13. A lighting fixture according to claim 1, wherein said housing is rectangular.

14. A modular lighting fixture for cleanrooms, comprising:
    a housing having first and second openings, said housing comprising a plurality of walls, each of said plurality of walls having a first and second portion;
    the first opening configured to receive a plate-like member positioned in said first opening;
    the second opening configured to receive an air filter to permit airflow exiting said air filter to flow through said second opening;
    a first primary sealing member positioned along said first portion of at least one of said plurality of walls and above said first opening to interengage a first modular member adjacent at least one of said plurality of walls to effect a seal therebetween such that said first opening and said first modular member are positioned at a lowest vertical point of said fixture; and
    a second primary sealing member positioned along said second portion of at least one of said plurality of walls adapted to interengage a second modular member adjacent at least one of said plurality of walls to effect a seal therebetween.

15. A modular lighting fixture according to claim 14, wherein the primary sealing members comprise knife-edge flanges.

16. A modular lighting fixture according to claim 14, wherein said first and second primary sealing members respectively interengage a first and second complementary sealing member.

17. A modular lighting fixture according to claim 16, wherein said complementary sealing members comprise troughs.

18. A modular ceiling system for cleanrooms, comprising:
    a walled housing having an upper and a lower opening;

the lower opening configured to receive a plate-like membrane positioned in said lower opening;

a lighting fixture located within said walled housing between said lower opening and said upper opening;

the upper opening configured to receive an air filter to permit airflow exiting said air filter to flow through said upper opening; and a primary sealing member positioned along at least a portion of said walled housing and above said lower opening to interengage a complementary sealing member of a modular member adjoining said walled housing to effect a seal therebetween such that said walled housing and said modular member are horizontally flush at a lowest point of said modular ceiling system.

19. A modular ceiling system according to claim 18, wherein the primary sealing member comprises a knife-edge flange.

20. A modular ceiling system according to claim 18, wherein the complementary sealing member comprises a trough.

21. A modular lighting fixture for insertion in a clean room ceiling, comprising:

a first modular member having an upper and a lower opening, said first modular member comprising a plurality of walls, each of said walls having an upper and lower portion;

the lower opening adapted to receive an air permeable membrane positioned in said lower opening;

the upper opening adapted to receive an air filter to permit airflow exiting said air filter to flow through said upper opening;

a first sealing member positioned along the lower portion of at least one of said plurality of walls and above said lower opening to engage an adjacent modular filter of a second modular member in sealing relation such that said lower opening and said second modular member are equally positioned at a lowest vertical point of said clean room ceiling;

a second sealing member positioned along at least one of said plurality of walls and above said first sealing member adapted to engage said air filter in sealing relation; and at least one supporting member extending from at least one of said plurality of walls adapted to engage said adjacent modular filter in a position such that the bottom of the first modular member is substantially flush with the bottom of said second modular member.

22. A modular lighting fixture as claimed in claim 21, further comprising a track located along at least one of said plurality of walls and inclined toward said adjacent modular filter.

23. A modular lighting fixture as claimed in claim 22, comprising at least one supporting member located within said track.

24. A modular ceiling system, comprising:

a walled housing having a lower and an upper opening, the lower opening configured to support an air-permeable membrane, the upper opening configured to receive a first air filter to permit airflow exiting said air filter to flow through said upper opening, a first sealing member positioned along each wall of the housing and above said lower opening to interengage a proximate walled housing to effect a seal therebetween, and a second sealing member positioned along each said wall and above said first sealing member to interengage said first air filter to effect a seal therebetween;

said proximate walled housing enclosing a second air filter, said proximate walled housing sealed to the walled housing so that the housings are substantially vertically flush at a lowest vertical point of said modular ceiling system; and a frame adapted to surround said walled housing and said proximate walled housing and sealably engage said housings, thereby creating a modular unit.

25. A modular ceiling system as claimed in claim 24, wherein said modular ceiling system comprises a plurality of walled housings and a plurality of proximate walled housings.

* * * * *